March 24, 1953  E. P. DE GARMO  2,632,245
LEMON CLIPPER
Filed July 26, 1949
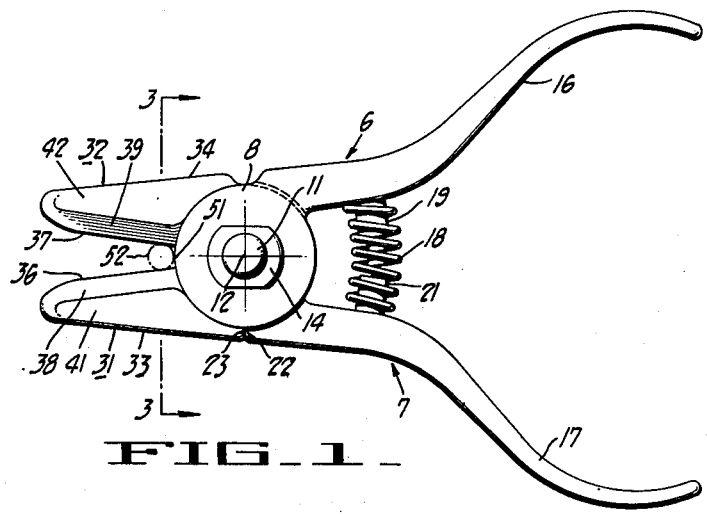
FIG. 1.
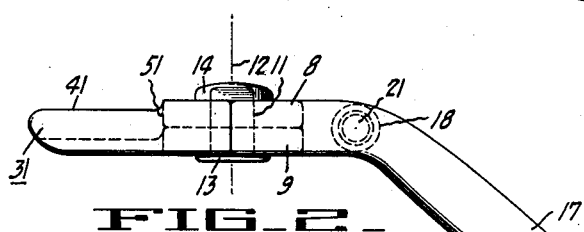
FIG. 2.
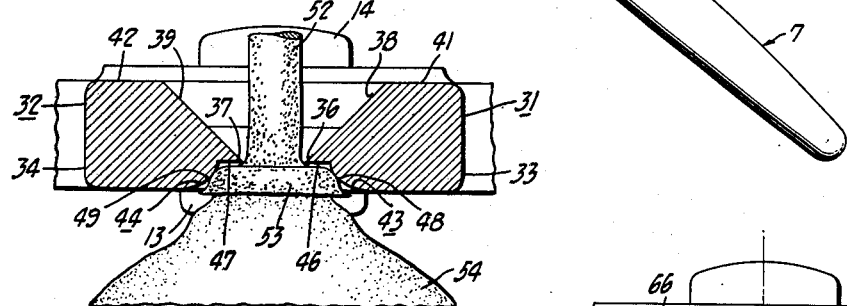
FIG. 3.
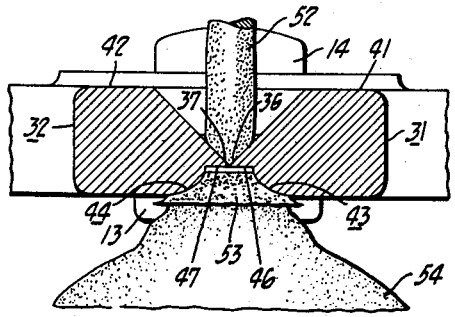
FIG. 4.
FIG. 5.
INVENTOR.
E. Paul De Garmo
BY *Marcus Lothrop*
ATTORNEY Patented Mar. 24, 1953

2,632,245

UNITED STATES PATENT OFFICE 2,632,245

LEMON CLIPPER

Ernest Paul De Garmo, Berkeley, Calif., assignor to The Regents of the University of California, Berkeley, Calif., a corporation of California Application July 26, 1949, Serial No. 106,770

2 Claims. (Cl. 30—179)

My invention relates generally to means for removing growing fruit from trees and is especially concerned with a device for use by a picker in removing a lemon from a lemon tree.

In the usual present practice lemons are permitted to grow on the trees until they have attained a predetermined size and are ready and otherwise right for picking. The lemon then is at the end of a woody stem on the tree and at the junction of the lemon and the stem there is a semi-woody, rather hard circular disc or button which is outwardly or toroidally curved. In removing the lemon from the tree it is customarily first to clip the stem at a remote point considerably removed from the lemon so that an inch more or less of stem is removed from the tree with the lemon. Susequently, and as a separate step, when the lemon can be more readily observed and more carefully handled the stem is again clipped. After the second clipping a minimum amount of stem remains adjacent the button and attached to the lemon. This is the desired condition for the reason that any projecting stem is relatively sharp and hard and when a number of lemons are together it is inclined to bruise the skin of the adjacent fruit. If the stem is cut so close to the lemon as to sever the button itself there is provided an opening that may lead to spoilage of the lemon. The stem is therefore cut as close as possible to but not into the button. The standardized technique involves both a preliminary, rough cutting of the lemon with a length of stem from the tree and a subsequent precise cutting of the surplus stem from the lemon itself.

It is therefore an object of my invention to provide a lemon clipper which will cut the stem at a very close or predetermined location with respect to the button in one operation as the lemon is removed from the tree.

Another object of my invention is to eliminate one of the cutting or clipping operations now normally utilized.

A further object of my invention is to provide a lemon clipper constructed so as to cut the stem or sever the lemon from the tree at a predetermined location satisfactory for avoiding excessive sharp stem which might bruise adjacent fruit and also for avoiding cutting into of the lemon button.

Another object of the invention is to provide a lemon clipper sufficiently like those now utilized as to be readily received and utilized by the laborers engaged in picking.

A further object of my invention is to provide a lemon clipper which will operate with various sizes of fruit and especially with various sizes of stems encountered at different times in the season and in different growing areas.

A still further object of the invention is to provide a lemon clipper which can readily and cheaply be manufactured so that its distribution can be readily accomplished.

A still further object of the invention is to provide a lemon clipper the general arrangement and construction of which are such as to enhance its ability to remain sharp for much or all of a picking season.

An additional object of my invention is in general to improve lemon clippers.

Other objects, together with the foregoing, are attained in the embodiments of my invention described in the accompanying description and illustrated in the accompanying drawings in which Figure 1 is a plan of a lemon clipper constructed in accordance with my invention and shown in open position.

Figure 2 is a side elevation of the lemon clipper illustrated in Figure 1.

Figure 3 is a cross section to an enlarged scale, the plane of section being indicated by the line 3—3 of Figure 1.

Figure 4 is a cross section similar to Figure 3 but showing the clipper in closed position.

Figure 5 is a view similar to Figure 3 but showing a modified form of my clipper.

In its preferred form, the lemon clipper is comprised of a pair of levers generally designated 6 and 7. These levers are contoured in mirror symmetry for the most part and are preferably fabricated say of forged metal. The lever 6 is formed with an integral central boss 8 which is primarily a circular disc cooperating with a similar, generally circular disc-like boss 9 forming part of the lever 7. The discs are centrally perforated to be journalled on a pivot pin 11 establishing a pivot axis 12. The pivot pin 11 has a flat head 13 at one side in abutment with the boss 9 and at the other side is engaged by a securing nut 14. With this arrangement, as is customary, the central bosses 8 and 9 are pivotally movable with respect to each other about the axis 12.

Included in the levers 6 and 7 and extending from the respective bosses 8 and 9 are handle portions 16 and 17, respectively, downwardly and outwardly divergent with respect to the axis 12 and smoothed and contoured readily to fit within the hand of a user. The handle portions 16 and 17 are urged into their open or spread position by a coil spring 18 disposed between them and supported on lugs 19 and 21 extending from the respective handle portions. A shoulder 22 near the junction of the handle portion 7 with its disc 9 contacts a similar shoulder 23 extending from the adjacent disc 8 to establish the maximum amount of opening of the clipper.

Included in the levers 6 and 7 and in effect demarked from the handle portions 16 and 17 by the axis 12 or the pivot 11 are head portions 31 and 32, respectively, the head portion 31 being included with the lever 6 and the head portion 32 being a part of the lever 7. The head portions 31 and 32 are generally quite similar to each other and are made for the most part in mirror symmetry, one of them being an extension of the disc 8 and the other one of them being an extension of the disc 9. The head portions 31 and 32 are generally confined between a pair of parallel planes perpendicular to the axis 12 and are tapered along the outer sides 33 and 34 to form generally smooth continuances of the shape of the handles 6 and 7 when the clipper is open. Along their inner sides the head portions 31 and 32 are provided with cutting edges 36 and 37 respectively. Each of these is for the most part generally radial with respect to the axis 12 or center. The edges are so disposed that they are co-planar in a plane perpendicular to the axis 12 and so that they substantially abut or come into contact edge to edge with each other when the handle portions 16 and 17 are operated to close the clipper.

The edges 36 and 37 are located substantially below the median or central transverse plane of the clipper as shown in Figure 3, and are formed at the terminus of upper surfaces 38 and 39, respectively, which diverge upwardly and outwardly from the cutting edges 36 and 37 until they merge with the top surfaces 41 and 42 of the clipper. The cutting edges 36 and 37 can also be considered as occurring at the junction of the upper surfaces 38 and 39 with lower surfaces, generally designated 43 and 44, in a general way diverging outwardly andd ownwardly from the cutting edges. These lower surfaces 43 and 44 are not entirely dihedral planes as are the upper surfaces 38 and 39. Rather, the lower surfaces adjacent the inner portions are defined by co-planar inner areas 46 and 47 perpendicular to the axis 12. One cutting edge is disposed between the co-planar inner area 46 and the upper surface 38 of the head portion 31, whereas the other cutting edge 37 is disposed at the junction of the inner area 47 and the upper surface 39 of the head portion 32.

The co-planar areas 46 and 47 outwardly of the cutting edges merge with camming or guiding or locating areas 48 and 49, respectively. These areas although they extend in plan generally radially of the head portions, in cross section diverge downwardly and outwardly from the areas 46 and 47 and make angles with areas 46 and 47 less than the angles between surfaces 38 and 39 and areas 46 and 47. They can be somewhat curved, but preferably are plane surfaces at about 30 degrees to the cutting areas 46 and 47 and are slightly rounded at their lower extremities. As especially shown in Figure 1, the cutting edges 36 and 37 converge approximately on the pivot center so that the forward surface 51 defined both by the disc 8 and the disc 9 when the clipper is open serves as an abutment for the lemon stem 52. This stem is approximately a circular cylinder in most instances although its diameter varies in different growing regions and at different times.

The opening as shown in Figure 1 defined by the cutting edges and by the surface 51 is such that a picker grasping the handle portions 16 and 17 can readily lower the clipper along the stem 52 with the stem abutting the surface 51 and more or less tightly engaged between the cutting edges 36 and 37. The lowering movement of the head portions against the lemon is arrested by contact of the locating or camming surfaces 48 and 49 with the button 53 of the head of the lemon 54. There is consequently a disposition of the clippers substantially as shown in Figure 3 with the cutting edges very close to but away from any possible contact with the button 53 as established by locating surfaces 48 and 49 but with the cutting edges in position to sever the stem.

When the handle portions 16 and 17 are squeezed together the cutting edges engage the lemon stem and the angularity of the upper surfaces 38 and 39 opposes the camming tendency of the lower surfaces 48 and 49 so that the actual path of the cutting edges through and across the lemon stem 52 is substantially a plane with the parts meeting as shown approximately in Figure 4. The button 53 deforms slightly as shown so that the effect of all of the cutting, angular and camming portions of the head is to provide a substantially planar severance of the stem from the fruit as the fruit is removed from the tree. There remains an extremely short stem portion of a predetermined length in relationship to the button 53, with no sharp edges protruding, and with the button left intact. It is therefore possible to eliminate entirely the second clipping operation now standard and to save from 20 to 35 percent in picking time.

It is possible by suitable manufacture of the clippers to have the cutting edges maintain their sharpness throughout a long period. It has been deemed preferable in some instances, as shown in Figure 5, not to fabricate the clippers entirely of one material but rather to provide the head portions 61 and 62 with recesses 63 and 64 in which inserts 66 and 67 are disposed. These inserts are held in location either by brazing or by mechanical fastening in any suitable way and are preferably made of material resistant to the substances encountered in clipping and are consequently capable of long use without dulling. At the end of a protracted period, say a picking season, the removable cutting jaws 66 and 67 are removed and replaced by others in proper condition. The positioning of the removable cutting edges 66 and 67 and their shape is entirely consistent with the provision of the camming surfaces 68 and 69 so that the envelope, cross sectional contour of a structure made according to Figure 5 is substantially identical with that of the structure shown in the remaining figures.

In general, with the clipper disclosed herein, one clipping operation has been eliminated from the present, practical lemon picking and great savings have been made in the clipping time. Also, an improved product results. The clippers can be utilized in connection with other generally similar fruits and in comparable environments.

I claim:

1. A lemon clipper comprising a pair of levers pivoted together between their ends to turn about a pivotal axis and having handle portions on one side of said axis and head portions on the other side; said head portions when closed having abutting, cutting edges extending in a plane perpendicular to said axis, said cutting edges being defined by the junctions of upper surfaces converging downwardly and inwardly and lower surfaces each having a planar surface adjacent said cutting edges perpendicular to said axis, said planar areas each merging with an outwardly and downwardly diverging, smoothly curved, convex locating surface having a width of the general order of magnitude of twice the width of said planar area.

2. A lemon clipper as defined in claim 1 wherein said handle portions extend outwardly in a direction oblique to a plane normal to said axis and containing said planar areas and away from said plane on the same side thereof as said lo-locating surfaces.

E. PAUL DE GARMO.

REFERENCES CITED

The following references are of record in the file of this patent:

UNITED STATES PATENTS

| Number | Name | Date |
| --- | --- | --- |
| 496,584 | Taft | May 2, 1893 |
| 512,461 | Walter | Jan. 9, 1894 |
| 832,804 | Oneal et al. | Oct. 9, 1906 |
| 833,714 | Goode | Oct. 16, 1906 |
| 1,180,450 | Smith | Apr. 25, 1916 |
| 1,287,637 | Cobb | Dec. 17, 1918 |
| 1,769,401 | Tancre | July 1, 1930 |
| 2,529,949 | Jones | Nov. 14, 1950 |